United States Patent Office 3,749,689
Patented July 31, 1973

3,749,689
POLYESTER COMPOSITION AND METHOD OF MANUFACTURING THE SAME
Silvio Vargiu, Sesto San Giovanni, Beppino Passalenti, Milan, and Pierluigi Abruzzi, Bergamo, Italy, assignors to Società Italiana Resine S.p.A., Milan, Italy
No Drawing. Filed Dec. 10, 1970, Ser. No. 97,024
Claims priority, application Italy, Dec. 23, 1969, 26,199/69
Int. Cl. C08f 45/24; C09d 5/02
U.S. Cl. 260—29.6 NR
14 Claims

ABSTRACT OF THE DISCLOSURE

Unsaturated liquid polyester compositions are stabilised by aromatic organic compounds containing phenolic hydroxyl and tertiary amine groups in the molecule.

---

The present invention relates to particular hardenable compositions comprising unsaturated liquid polyesters and a method of manufacturing the same.

More precisely, the invention relates to stable aqueous emulsions comprising unsaturated liquid polyesters in combination with particular aromatic organic substances containing phenol groups and tertiary amine groups in the molecule. Such emulsions are hardened by the action of catalysts consisting of peroxide substances, to yield products having high mechanical properties and suitable for all manner of uses. It should be noted that during the course of the present description, the term unsaturated liquid polyesters is understood as referring to combinations between an aryl vinyl compound and the product obtained by polycondensing unsaturated polycarboxylic acids with polyhydroxylic alcohols. U.S. Pat. No. 2,855,373 filed May 11, 1952 describes a class of unsaturated liquid polyesters consisting of an unsaturated monomer (diallyl phthalate or styrene) in combination with the product of polycondensation obtained from an unsaturated alpha-beta dicarboxylic acid, glycols containing 2 to 10 carbon atoms in the molecule and a polyalkylene glycol of high molecular weight.

Such polyesters can easily be emulsified with water in the production of emulsions which set under the action of those catalysts and accelerators which are normally used in industry for hardening unsaturated liquid polyesters. In this way, hardened products are obtained which have good mechanical properties but which nevertheless have an undesired quality in that they tend in time to expel part of the water which they contain.

It has also been found that the emulsions described in the aforesaid U.S. patent, when provided with inert fillers and then hardened, product artifacts which have low mechanical properties.

It has now been found possible to eliminate or at least to reduce the drawbacks inherent in the prior art if the aqueous emulsions of the unsaturated liquid polyesters of the type described in the aforesaid U.S. patent are prepared in the presence of particular stabilisers consisting of aromatic organic compounds containing in the molecule phenol hydroxyl groups and tertiary amine groups.

More precisely, the stabilisers for the emulsions, which constitute one of the objects of the present invention, are those organic substances which have the following general formula:

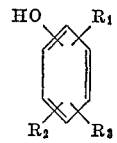

in which $R_1$ represents a group of the type

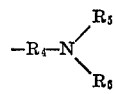

($R_4$, $R_5$ and $R_6$ being hydrocarbon radicals containing from 1 to 4 carbon atoms); $R_2$ represents hydrogen or has the same significance as $R_1$; $R_3$ represents hydrogen or hydroxyl (phenol), or has the same significance as $R_1$. The unsaturated liquid polyesters suitable for conversion to stable aqueous emulsions according to the present invention are constituted by the combination of an aryl vinyl type monomer and the unsaturated product obtained by polycondensation of polycarboxylic acids with polyhydroxylic alcohols and polyoxy ethylene glycols, these latter being constituted by those products with a molecular weight of 150 to 3000 and preferably 500 to 1500, having the following general formula:

$$HOCH_2(CH_2OCH_2)_nCH_2OH$$

More precisely those products of polycondensation are used which have an acidity number of 5 to 50, obtained by reaction of maleic and/or fumaric acids with a mixture of hydroxylated compounds consisting of polyoxyethylene glycols as previously defined in quantities of 2 to 50% by weight, the remaining percentage consisting of ethylene and/or propylene glycols.

It has been found that the best results are obtained when, in polycondensation, the above-mentioned unsaturated acids are partially substituted by phthalic acids.

More precisely, in polycondensation, a molar ratio is maintained between maleic and/or fumaric acids and phthalic acids of 0.5:1 to 2:1.

It should be noted that according to another aspect of the present invention, it is possible to condense the previously defined polycarboxylic acids with the ethylene and/or propylene glycols and separately with the polyoxymethylene glycols.

The resultant polycondensates are then mixed, preferably after addition of the aryl vinyl compound, unsaturated liquid polyesters being obtained which are useful for the purposes of the present invention.

Among the unsaturated liquid polyesters, it is possible to use styrene as an aryl vinyl compound in quantities of 15 to 50% by weight in respect of the product of polycondensation.

By using the stabilisers of the present invention, the previously defined unsaturated liquid polyesters may be converted to stable emulsions containing up to 50% and even up to 80% by weight of water when the proportion between the number of tertiary amine groups contained in the stabiliser and the number of free carboxylic groups contained in the product of polycondensation is comprised between 0.1:1 and 1:1.

Among the stabilisers belonging to the general class defined above, the following are preferred: 2,4,6-tri-(dimethyl amine) methyl phenol, 2,4,6-tri-(diethyl amine) methyl phenol, 2,4,6-tri-(methyl ethyl amine) methyl phenol and 2,4,6-tri-(dimethyl amine) ethyl phenol.

Under the conditions described, it is possible to obtain aqueous emulsions which are stable in course of time, which may be provided with inert fillers in quantities of 5 to 60% by weight in respect of the unsaturated liquid polyester.

More precisely, in the preparation of emulsions according to the present invention, the stabiliser is added to the unsaturated liquid polyester and the result agitated until complete homogenisation is achieved.

The resultant product is then agitated strongly while the water is added, having a pH of between 5.5 and 6.5, the stable emulsion thus being obtained.

In the preparation of filled emulsions, the inert fillers are added in the preferred form to the suspension which is kept in a state of gentle agitation.

The resultant emulsions are easily hardened by the action of those catalysts which are constituted by peroxide compounds, which are normally used in industry for the hardening of unsaturated liquid polyesters.

It is possible for the purpose to use: lauryl peroxide, benzyl peroxide, methyl ethyl ketone peroxide and cumene hydroperoxide, normally in quantities of 0.1 to 3% by weight in respect of the unsaturated liquid polyester.

In addition to peroxide substances, hardening may be carried out in the presence of activators consisting of salts of metals such as for example salts of cobalt, zinc, vanadium and manganese and/or basic organic compounds such as dimethyl aniline. Metallic accelerators are normally used in quantities of 0.005 to 0.5% by weight of unsaturated liquid polyester, the quantity being calculated as the metal. In particular, such accelerators, the quantities of which are commensurate with the gel time desired, are added to the unsaturated liquid polyester together with the previously defined stabilisers prior to formation of the aqueous emulsion. The inert fillers which may be used for the purposes of the present invention consist of carbonates, sulphates, kaolin, quartz, slate, titanium dioxide, mica and talc, and are added to the aqueous emulsions in quantities according to the procedures which have been set out hereinabove.

In the hardening of emulsions of polyesters according to the present invention, bodies of appropriate size and form are obtained by the moulding technique, normally carried out at ambient pressure, or even at a pressure above or below ambient pressure.

By working in this way, the further advantage is gained that the hardened products are easily detached from the mould with no need for separating means to be used.

The artifacts obtained also have high mechanical and flame-resistant properties.

A basic advantage of such artifacts over those which can be obtained with normal polyesters resides in the lower cost in that they include water as a structural element. It is worth noting that such artifacts may be subjected at pressures of up to 150 atm. with no sign of expulsion of their water content.

Furthermore, the compositions of the present invention have a low degree of toxicity and, in hardening, reach peaks of temperature which are so low as to eliminate any danger of fracture of the artifacts.

The hardened products can finally be worked by normal techniques used for timber.

The following experiments will serve as a further illustration of the invention, without however limiting it in any way.

EXAMPLE 1

Into a glass vessel fitted with a thermometer, agitator, separator for condensable products and a system for injecting inert gases, are placed: propylene glycol (1.5 mols) and isophthalic acid (1 mol).

This is heated to 210° C. with agitation in an inert gas, up to an acidity number of 45 to 50.

The mixture is then cooled to approx. 180° C. and the following added: propylene glycol (0.6 mols) and maleic anhydride (1.0 mols). It is then heated to temperatures of 195 to 200° C.

These temperatures are maintained until the polycondensate has an acidity number of 40 to 50 and a Gardner Z–Z1 viscosity measured at 25° C. and in 70% styrene solution. The mass is then cooled and ter-butyl catechol added in quantities equal to 100 p.p.m.

At 90 to 100° C., the result is diluted with styrene under considerable agitation until the solids content equals approx. 60%.

EXAMPLE 2

To every 100 parts by weight of unsaturated liquid polyester obtained as described in the first example, 2 parts by weight of a 50% styrene solution of 2,4,6-tri(dimethyl amine) methyl phenol, 0.5 parts by weight of dimethyl aniline and 2.5 parts by weight cobalt octoate 6% in metal are added. The mixture is agitated until the complete homogenisation is achieved. Subsequently, the agitator is run at 1500 r.p.m. and one part by weight of non-demineralised water is added, at a pH of approx. 6, for every part by weight of unsaturated liquid polyester. To the resultant solution which is maintained under gentle agitation, calcium carbonate is added in a quantity equal to 1 part by weight to every part by weight of unsaturated liquid polyester. After a few minutes, the emulsion is broken and water separated.

EXAMPLE 3

The following are placed in a glass vessel: di-propylene glycol, maleic anhydride and polyoxy methylene glycol (molecular weight 1500) in a molar ratio 1:1:0.03.

This is heated in a current of inert gas and with agitation, up to 160° C. The temperature is then raised to 195° C. gradually, over approx. 3 hours, resulting in a product with an acidity number of 55–60.

The flow of inert gas is then increased and at a Gardner viscosity Q–T (measured at 25° C. in 70% toluene solution) and acidity of approx. 40, the mixture is cooled to 150° C.

Hydroquinone is then added in a quantity equal to 100 p.p.m.

Finally, it is diluted with styrene at 100° C. until a dry content equal to approx. 50% is obtained.

EXAMPLE 4

To 100 parts by weight of unsaturated liquid polyester as obtained in Example 3 are added 0.05 parts by weight of a 5% quaternary ammonium salt in styrene and 2 parts by weight of 6% cobalt octoate.

The mixture is homogenised and then 100 parts by weight of nondemineralised water with a pH of approx. 6 added, the agitator being run at 1500 r.p.m.

Thus, a stable emulsion is obtained to which are added 2 parts by weight of methyl ethyl ketone peroxide.

The composition thus obtained had a gel time of 24 hours at ambient temperature.

By allowing hardening for 2 hours at 100° C. in metal moulds, artifacts were obtained having the following properties: resistance to flexion: 86.4 kg./sq. cm., elasticity modulus: $8.4 \cdot 10^3$ kg./sq. cm. A sample of the hardened product maintained in an ambient of 100° C. for 24 hours showed a weight loss equal to approx. 40%.

EXAMPLE 5

90 parts of by weight of unsaturated liquid polyester obtained as described in Example 1 are mixed with 10 parts by weight of liquid polyester prepared as described in Example 3.

The mixture is then homogenised with 1 part by weight of 2,4,6-tri(dimethyl amine) methyl phenol, 2.5 parts by weight 6% cobalt octoate and 0.5 parts by weight dimethyl aniline.

While the agitator is kept at 1500 r.p.m., 100 parts by weight of non-demineralised water at a pH of approx. 6 are added. The result is a highly stable emulsion which has demonstrated no weight loss after being kept at ambient temperature for 4 hours at approx. 150 mm. Hg.

Furthermore, the viscosity of the emulsion at 20° C., expressed in cps, was equal to 6500.

By adding to the emulsion 2 parts by weight of methyl ethyl ketone peroxide, a composition is obtained with a gel time of 38 mins., which is then hardened by being kept in metal moulds at 100° C. for 2 hours.

Thus, a hardened product is obtained which has the following specifications: resistance to flexion: 210 kg./sq. cm., resistance to torsion 5.2 kg./sq. cm., impact strength: 1.7 kg. cm./sq. cm., elasticity modulus: $7.5.10^3$ kg./sq. cm.

By heating the hardened product to 100° C. for 24 hours, a weight loss of approx. 25% was produced.

EXAMPLE 6

85 parts by weight of unsaturated liquid polyester obtained as described in the first example are mixed with 15 parts by weight of the polyester described in Example 3.

After proceeding exactly as described in Example 5, a stable emulsion was obtained which revealed a weight loss equal to 0.3% after being kept at a ambient temperature for 4 hours at approx. 150 mm. Hg.

Finally, the viscosity of the emulsion at 20° C., expressed in cps., was equal to 7,250.

By adding to the emulsion 2 parts by weight of methyl ethyl ketone peroxide, a composition is obtained with a gel time at 20° C. for 45 mins., the composition being hardened by being kept in metal moulds for 2 hours at 100° C.

Thus, a hardened product is obtained which was the following properties: resistance is flexion 235 kg./sq. cm., resistance to torsion 7.4 kg./sq. cm., impact strength 2.2 kg. cm./sq. cm., elasticity modulus $8.10^3$ kg./sq. cm.

By heating the hardened product to 100° C. for 24 hours, a weight loss equal to 27% was obtained.

EXAMPLE 7

80 parts by weight of unsaturated liquid polyester obtained as described in the first example are mixed with 20 parts by weight of the polyester obtained as described in Example 3. By proceeding exactly as described in Example 5, a very stable emulsion was obtained which showed a weight loss equal to approx. 0.7% after being maintained at ambient temperature for 4 hours at approx. 150 mm. Hg.

Furthermore, the viscosity of the emulsion at 20° C., expressed in cps, was equal to 7,750.

By adding to the emulsion 2 parts by weight of methyl ethyl ketone peroxide, a composition with a gel time at 20° C. equal to 59 mins. is obtained, which is hardened by being kept in metal moulds for 2 hours at 100° C.

Thus, a hardened product is obtained which has the following properties: resistance to flexion 205 kg./sq. cm., resistance to torsion 1.1 kg./sq. cm., impact strength 2 kg. cm./sq. cm., elasticity modulus $5.5.10^3$ kg./sq. cm.

Heating the hardened product to 100° C. for 24 hours resulted in the weight loss equal to approx. 25%.

EXAMPLE 8

70 parts by weight of the product of condensation obtained as described in Example 1 are mixed with 15 parts by weight of the product of polycondensation obtained as described in Example 3. To this mixture is then added styrene in a quantity equal to 15 parts by weight, 2.5 parts by weight of 6% cobalt octoate solution and 2 parts by weight of 50% styrene solution of 2,4,6,tri(dimethyl amine) methyl phenol.

To the resultant product are then added 50 parts by weight water and 50 parts by weight talc, the mixture being vigorously agitated.

Thus, a stable emulsion is obtained to which are added 2 parts by weight methyl ethyl ketone peroxide.

By causing the emulsion to harden for 2 hours at 100° C. in metal moulds, artifacts are obtained which have a flexion resistance equal to 125 kg./sq. cm.

Such artifacts, kept at 100° C. for 24 hours, showed a weight loss equal to approximately 10%.

What we claim is:

1. A stable and hardenable aqueous emulsion composition consisting essentially of a polycondensation product having an acidity number of from 5 to 50 of a polycarboxylic acid selected from the group consisting of maleic acid, fumaric acid and mixtures thereof with a polyhydroxyl compound consisting essentially of from 2 to 50% by weight of polyoxyethylene glycols having a molecular weight of from 150 to 3000 and from 98 to 50% by weight of at least one alkylene glycol selected from the group consisting of ethylene and propylene glycol;

from 15 to 50% by weight, based on the weight of said polycondensation product, of styrene;

an emulsion stabilizer of the formula:

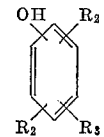

wherein $R_1$ represents:

$R_4$, $R_5$ and $R_6$ represent hydrocarbon radicals having from one to four carbon atoms; $R_2$ represents hydrogen or:

$R_3$ represents hydrogen, phenolic hydroxyl or:

said emulsion stabilizer being present in an amount such that the ratio of the number of tertiary amine groups in said emulsion stabilizer to the number of free carboxyl groups in said polycondensation product varies from 0.1:1 to 1:1; and water in an amount of up to 80% by weight, based on the weight of said polycondensation product and styrene.

2. The aqueous emulsion composition of claim 1 wherein the molecular weight of the polyoxyethylene glycols is from 500 to 1500.

3. The aqueous emulsion composition of claim 1 wherein the emulsion stabilizer is selected from the group consisting of 2,4,6-tri-(dimethyl amine) methyl phenol, 2,4,6-tri (diethyl amine) methyl phenol, 2,4,6-tri (methyl ethyl amine) methyl phenol and 2,4,6-tri (dimethyl amine) ethyl phenol.

4. The aqueous emulsion composition of claim 1 wherein, in the polycondensation product, said polycarboxylic acid is partially substituted by phthalic acids such that the molar ratio between said polycarboxylic acid and said phthalic acids varies from 0.5:1 to 2:1.

5. The aqueous emulsion composition of claim 1 wherein said water has a pH of from 5.5 to 6.5.

6. A stable and hardenable aqueous emulsion composition consisting essentially of a polycondensation product having an acidity number of from 5 to 50 of a polycarboxylic acid selected from the group consisting of maleic acid, fumaric acid and mixtures thereof with a polyhydroxyl compound consisting essentially of from 2 to 50% by weight of polyoxyethylene glycols having a molecular weight of from 150 to 3000 and from 98 to 50% by weight of at least one alkylene glycol selected from the group consisting of ethylene and propylene glycol;

from 15 to 50% by weight, based on the weight of said polycondensation product, of styrene;

an emulsion stabilizer of the formula:

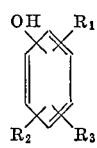

wherein $R_1$ represents:

$R_4$, $R_5$ and $R_6$ represent hydrocarbon radicals having from one to four carbon atoms; $R_2$ represents hydrogen or:

$R_3$ represents hydrogen, phenolic hydroxyl or:

said emulsion stabilizer being present in an amount such that the ratio of the number of tertiary amine groups in said emulsion stabilizer to the number of free carboxyl groups in said polycondensation product varies from 0.1:1 to 1:1;

from 0.005 to 0.5% by weight, calculated as metal, based upon the weight of said polycondensation product and styrene, of a metallic salt selected from the group consisting of salts of cobalt, zinc, vanadium and manganese; and water in an amount of up to 80% by weight, based on the weight of said polycondensation product and styrene.

7. A stable and hardenable aqueous emulsion composition consisting essentially of a polycondensation product having an acidity number of from 5 to 50 of a polycarboxylic acid selected from the group consisting of maleic acid, fumaric acid and mixtures thereof with a polyhydroxyl compound consisting essentially of from 2 to 50% by weight of polyoxyethylene glycols having a molecular weight of from 150 to 3000 and from 98 to 50% by weight of at least one alkylene glycol selected from the group consisting of ethylene and propylene glycol;

from 15 to 50% by weight, based on the weight of said polycondensation product, of styrene;

an emulsion stabilizer of the formula:

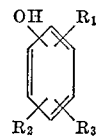

wherein $R_1$ represents:

$R_4$, $R_5$ and $R_6$ represent hydrocarbon radicals having from one to four carbon atoms; $R_2$ represents hydrogen or:

$R_3$ represents hydrogen, phenolic hydroxyl or:

said emulsion stabilizer being present in an amount such that the ratio of the number of tertiary amine groups in said emulsion stabilizer to the number of free carboxyl groups in said polycondensation product varies from 0.1:1 to 1:1;

from 5 to 60% by weight, based upon the weight of said polycondensation product and styrene, of an inert filler; and water in an amount of up to 80% by weight, based on the weight of said polycondensation product and styrene.

8. The aqueous emulsion composition of claim 7 wherein the inert filler is selected from the group consisting of calcium carbonate, kaolin, quartz, slate, titanium dioxide, mica and talc.

9. In a stable and hardenable aqueous emulsion composition consisting essentially of a polycondnesation product of an unsaturated alpha-beta-carboxylic acid with a polyhydroxyl compound comprising a mixture of alkylene glycols having from 2 to 10 carbon atoms in the molecule and a high molecular weight polyalkylene glycol or mixtures thereof; and an aryl vinyl compound;

the improvement comprising said composition further consisting essentially of:

an emulsion stabilizer of the formula:

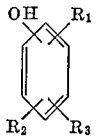

wherein $R_1$ represents:

$R_4$, $R_5$ and $R_6$ represent hydrocarbon radicals having from one to four carbon atoms; $R_2$ represents hydrogen or:

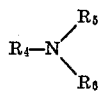

$R_3$ represents hydrogen, phenolic hydroxyl or:

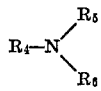

said emulsion stabilizer being present in an amount such that the ratio of the number of tertiary amine groups in said emulsion stabilizer to the number of free carboxyl groups in said polycondensation product varies from 0.1:1 to 1:1; and water in an amount of up to 80% by weight, based on the weight of said polycondensation product and said aryl vinyl compound.

10. The aqueous emulsion composition of claim 9 wherein said polyalkylene glycol is a polyoxyethylene glycol having a molecular weight of from 150 to 3000.

11. The aqueous emulsion composition of claim 10 wherein said alkylene glycol is ethylene glycol, propylene glycol or mixtures thereof.

12. The aqueous emulsion composition of claim 11 wherein said polyhydroxyl compound consists essentially of from 2 to 50% by weight of said polyoxyethylene glycol and from 98 to 50% by weight of said alkylene glycol.

13. The aqueous emulsion composition of claim 9 wherein said polycondensation product has an acidity number of from 5 to 50.

14. The aqueous emulsion composition of claim 13 wherein said unsaturated alpha-beta dicarboxylic acid is maleic acid, fumaric acid or mixtures thereof.

References Cited

UNITED STATES PATENTS

| | | | |
|---|---|---|---|
| 2,855,373 | 8/1958 | Guenther | 260—29.6 R |
| 3,150,114 | 9/1964 | Rockoff | 260—45.95 |
| 3,240,736 | 3/1966 | Beckwith | 260—29.6 R |

JOAN B. EVANS, Primary Examiner

U.S. Cl. X.R.

260—29.2 UA, 29.6 T, 29.6 TA, 29.6 H